Patented Mar. 18, 1924.

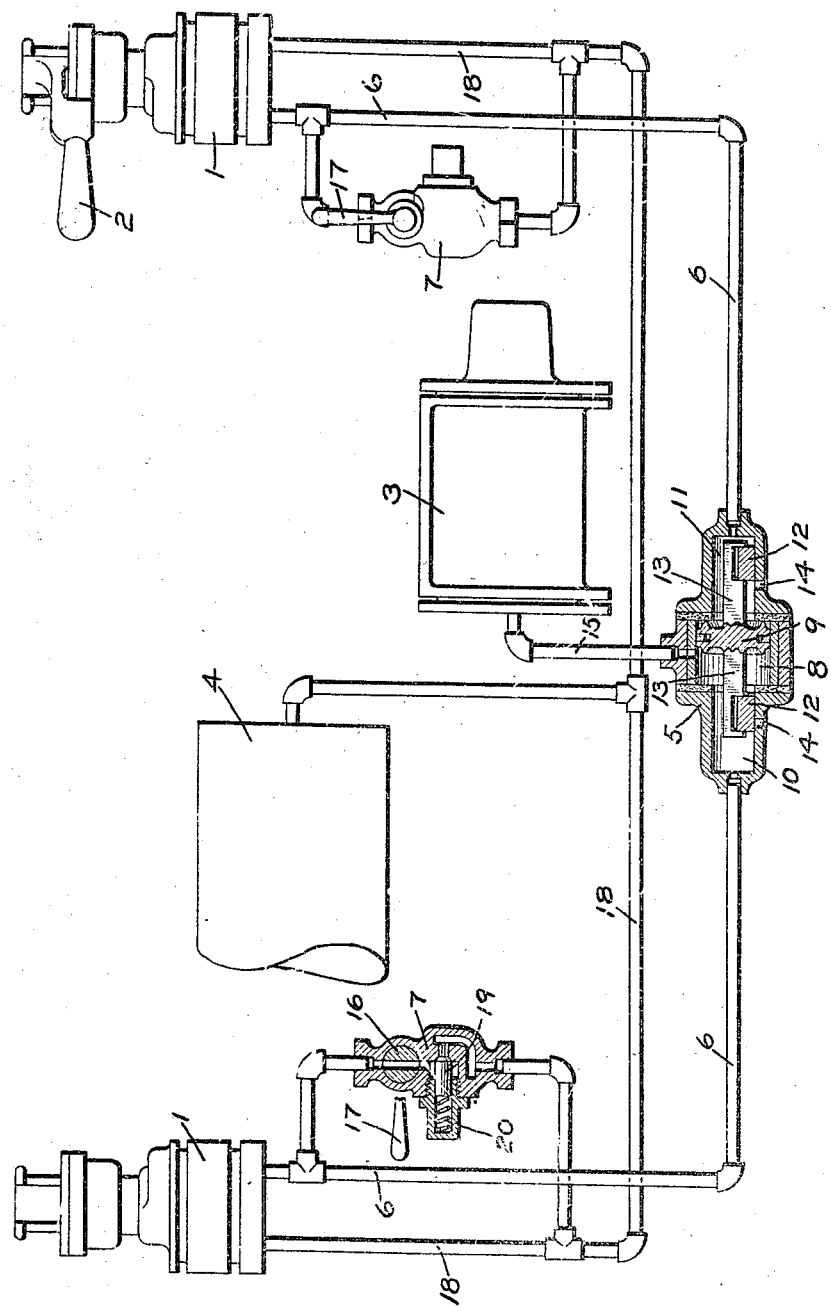

1,486,939

UNITED STATES PATENT OFFICE.

HARRY J. WINTER, OF SOUTHGATE, LONDON, ENGLAND, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 16, 1923. Serial No. 625,493.

*To all whom it may concern:*

Be it known that I, HARRY J. WINTER, a subject of the King of Great Britain and Ireland, and resident of Southgate, N. 14, in the county of London, England, have invented a certain new and useful Improvement in Fluid-Pressure Brakes, of which the following is a specification.

This invention relates to fluid pressure brakes, and more particularly to a straight air brake equipment.

It has heretofore been proposed to provide a straight air brake equipment having a brake valve device at each end of the car and a double check valve device located in the pipe through which fluid is supplied by the brake valve device at either end of the car to the brake cylinder, said double check valve being adapted to be operated by fluid supplied from the brake valve device at the operating end of the car to open communication through said pipe from the operating brake valve device to the brake cylinder and to cut off communication from the brake valve device at the non-operating end through said pipe to the brake cylinder.

In some cases, it may be desirable to be able to effect an application of the brakes from the non-operating end of the car independently of the motorman. An independent or auxiliary controlling valve may be provided for this purpose, but a difficulty then arises that the motorman at the operating end of the car may not be able to release the brakes by reason of the fact that the double check valve having shifted to the position cutting off communication from the operating brake valve to the brake cylinder, the motorman may not have sufficient pressure of fluid to move the double check valve so as to reestablish communication from the operating brake valve to the brake cylinder.

The principal object of my invention is to provide a straight air brake equipment having means for overcoming the above difficulty.

In the accompanying drawing, the single figure is a diagrammatic view of a straight air brake equipment embodying my invention.

As shown in the drawing, the equipment may comprise a brake valve device 1 at each end of the car, having an operating handle 2 adapted to operate either brake valve device, a brake cylinder 3, a main reservoir 4 or other source of fluid under pressure, a double check valve device 5 located in the straight air pipe 6 so as to control communication from either brake valve device through said pipe to the brake cylinder, and an auxiliary control or conductor's valve 7 at each end of the car.

The double check valve device 5 may comprise a casing having a central piston chamber 8 containing a piston 9 and valve chambers 10 and 11 on opposite sides of the piston chamber and each containing a slide valve 12 adapted to be operated through a stem 13 by the piston 9 for controlling an exhaust port 14. The straight air pipe 6 from the brake valve device 1 at one end of the car opens into valve chamber 10 and the straight air pipe from the brake valve device at the other end of the car opens into valve chamber 11. The brake cylinder pipe 15 opens into the piston chamber 8 at a central point, so that when the piston 9 is seated in either of its seating positions, the straight air pipe 6 from one brake valve is connected to the brake cylinder while communication from the other brake valve device through the straight air pipe to the brake cylinder is cut off.

The auxiliary controlling valve device 7 may comprise a casing having a cock 16 adapted to be operated by a handle 17 for controlling communication from pipe 18, leading to the main reservoir 4, to the straight air pipe 6. Interposed in this by-pass connection is a pressure limiting valve 19, subject to the pressure of a spring 20, so that the maximum pressure of fluid which may be supplied to the brake cylinder by operation of the conductor's valve is a degree less than the pressure in the main reservoir 4 according to the pressure exerted by the spring 20.

In operation, let it be assumed that the brake valve device 1 shown at the right in the drawing is the operating brake valve. If it is desired to effect an application of the brakes from the left or non-operating end, the conductor or other operator turns the cock 16 to its open position, as shown at the left in the drawing and fluid supplied from the main reservoir pipe 18 then flows past the pressure limiting valve 19 to the straight air pipe 6. The double check valve piston 9 is then shifted to the right and communication is established from the straight air pipe leading to the non-operating end of the car to the brake cylinder 3.

As before stated, the maximum pressure of fluid which can be supplied to the brake cylinder by operation of the conductor's valve is less than the pressure of fluid in the main reservoir by reason of the reducing action of the valve 19 and consequently, should the motorman at the operating end of the car desire to release the brakes, he can always do so, by first moving the brake valve handle to application position so as to supply fluid at full main reservoir pressure to the straight air pipe. Main reservoir pressure being higher than the pressure in the brake cylinder acting on the opposite side of the piston 9, said piston will be shifted to the left, thus reestablishing communication from the operating brake valve 1 at the right through the straight air pipe to the brake cylinder.

When the piston 9 moves to the left, the slide valve 12 in valve chamber 10 uncovers the exhaust port 14, so that fluid is vented from the straight air pipe 6 at the left and consequently, the piston 9 will remain at the left hand seating position when the operating brake valve is turned to release position in order to release fluid from the brake cylinder.

It will be evident that the same operation occurs whichever end of the car happens to be the operating end.

Having now described my invention, what I claim as new and desire to secure by Letters Patent, is:

1. In a fluid pressure brake system, the combination with a brake cylinder and a pipe for supplying fluid to the brake cylinder from either end of the car, of means operated by fluid supplied through said pipe from one end of the car for venting fluid from said pipe leading to the other end of the car.

2. In a fluid pressure brake system, the combination with a brake cylinder and a pipe for supplying fluid to the brake cylinder from either end of the car, of means operated by fluid supplied through said pipe from one end of the car for opening communication from that end of the car to the brake cylinder and for venting fluid from said pipe leading to the other end of the car.

3. In a fluid pressure brake system, the combination with a brake cylinder and a pipe for supplying fluid to the brake cylinder from either end of the car, of means operated by fluid supplied through said pipe from one end of the car for opening communication from that end of the car to the brake cylinder and for closing communication through said pipe from the other end of the car to the brake cylinder and for venting fluid from the last mentioned pipe.

4. The combination with a brake valve at each end of the car, a brake cylinder, and a pipe through which fluid is supplied from either brake valve to the brake cylinder, of a double check valve device for controlling communication from either brake valve to said brake cylinder and operated by the flow of fluid under pressure from one brake valve through said pipe to the brake cylinder for cutting off communication from the other brake valve through said pipe to the brake cylinder and for venting fluid from the pipe leading from said other brake valve to said double check valve.

5. The combination with a brake cylinder, of a double check valve device, pipes leading from opposite ends of the car to said double check valve device and through which fluid under pressure is supplied to the brake cylinder, said double check valve device having a position in which one pipe is connected to the brake cylinder and the other pipe is vented to the atmosphere.

6. The combination with a brake valve device at each end of the car, a brake cylinder, and a pipe through which fluid under pressure is supplied from each brake valve to the brake cylinder, of a double check valve device for controlling communication from each pipe to the brake cylinder, an auxiliary controlling valve for also supplying fluid under pressure through one of said pipes, and means for limiting the pressure of fluid supplied by said auxiliary controlling valve.

7. The combination with a brake valve device at each end of the car, a brake cylinder, and a pipe through which fluid under pressure is supplied from each brake valve to the brake cylinder, of a double check valve device for controlling communication from each pipe to the brake cylinder, an auxiliary controlling valve at each end of the car for supplying fluid under pressure to either pipe, and means for limiting the pressure of fluid supplied by each controlling valve.

8. The combination with a brake valve device at each end of the car, a source of fluid under pressure, a brake cylinder, and a pipe through which fluid is supplied by either brake valve device from said source to the brake cylinder, of a double check valve device for controlling communication from each pipe to the brake cylinder, an auxiliary controlling valve for supplying fluid to each pipe, and means for limiting the pressure of fluid supplied by said auxiliary controlling valve to a degree less than the pressure in said source of pressure.

In testimony whereof I have hereunto set my hand.

HARRY J. WINTER.